(12) United States Patent
Mueller et al.

(10) Patent No.: US 7,788,966 B2
(45) Date of Patent: Sep. 7, 2010

(54) DEVICE AND METHOD TO DIAGNOSE VACUUM SYSTEMS

(75) Inventors: Hannes Mueller, Hamburg (DE); Wilhelm Lutzer, Zarpen (DE); Marc Scheel, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 703 days.

(21) Appl. No.: 11/627,178

(22) Filed: Jan. 25, 2007

(65) Prior Publication Data

US 2007/0199139 A1 Aug. 30, 2007

Related U.S. Application Data

(60) Provisional application No. 60/762,366, filed on Jan. 25, 2006.

(30) Foreign Application Priority Data

Jan. 25, 2006 (DE) .................. 10 2006 003 586

(51) Int. Cl.
*G01M 3/02* (2006.01)
(52) U.S. Cl. .......................................... 73/37
(58) Field of Classification Search ............. 73/37, 73/49.2, 40.5 R; 4/431
See application file for complete search history.

(56) References Cited

U.S. PATENT DOCUMENTS

| 5,105,653 | A | * | 4/1992 | Konter | 73/49.2 |
| 5,515,555 | A | | 5/1996 | Wormcke | |
| 6,427,523 | B1 | * | 8/2002 | Seabrook | 73/40.7 |
| 2001/0011391 | A1 | * | 8/2001 | Rozenblatt | 4/653 |
| 2004/0118186 | A1 | * | 6/2004 | Shultis | 73/49.2 |

FOREIGN PATENT DOCUMENTS

| DE | 19921197 A1 | 11/1999 |
| DE | 102005013566 A1 | 10/2006 |

* cited by examiner

*Primary Examiner*—John Fitzgerald
(74) *Attorney, Agent, or Firm*—Christopher Paradies; Fowler White Boggs P.A.

(57) ABSTRACT

A device to diagnose a vacuum system comprises a pipe with a first opening that can be closed by a hingable cover, and a second opening that is designed to establish a pressure-proof connection to the vacuum system. The diagnostic device may be operated in a volume-flow mode in which the cover is open in order to determine a volume flow in the base body, and in a negative-pressure mode in which the cover is closed so as to allow to draw conclusions about the available pressure difference.

15 Claims, 2 Drawing Sheets

DEVICE AND METHOD TO DIAGNOSE VACUUM SYSTEMS

RELATED ART

This application claims the benefit of the filing date of U.S. Provisional Patent Application No. 60/762,366 filed Jan. 25, 2006 and of German Patent Application No. 10 2006 003 586.0 filed Jan. 25, 2006, the disclosures of which are hereby incorporated herein by reference.

FIELD OF THE INVENTION

The field relates to a device and a method to diagnose a vacuum system, in particular, for application on a vacuum toilet in an aircraft.

BACKGROUND OF THE INVENTION

Vacuum systems designate special pneumatic conveying installations. Generally speaking, in such systems, the transport takes place by applying a pressure differential to a material to be conveyed, or conveying takes place by taking along, in the gas flow caused by the pressure difference, said material to be conveyed. Air is used as the transport medium.

Vacuum systems in aircraft are used to transport waste (feed) from the cabin, i.e., from the toilets and from the galley, into a central collection tank. In this arrangement, the charging material is conveyed to the collection container by way of a pipeline network, wherein negative pressure in the collection container ensures the necessary pressure differential in relation to the cabin pressure.

In this implementation of vacuum systems, deposits build up in the pipe system, where deposits have a negative effect on the transport behaviour. Therefore, the pipeline system has to be cleaned regularly. Up to now, this has involved standard procedures at regular intervals, with such standard procedures essentially comprising a visual inspection of the pipeline system for any deposits.

SUMMARY OF THE INVENTION

According to an exemplary embodiment, an independent diagnostic device is created, and may, for example, be used on a vacuum toilet so as to examine the conveyance behaviour of a vacuum system that communicates with the vacuum toilet, and which may not necessitate any intervention in the vacuum system.

The device, according to one embodiment, comprises a hollow base body, for example, a pipe, with a first opening that can be closed by a hingable cover. At the end opposite the first opening of the pipe, there is a second opening of the pipe, whose opening is designed to establish a pressure-proof connection to the vacuum system. The second opening may be, for example, designed so as to be flexible, in order to possibly be able to establish a sealed contact with the inner surface of the vacuum toilet in the region of the removal opening. The device, according to the exemplary embodiment, further comprises an acquisition device which may, for example, be arranged outside the pipe so as to acquire measured values that reflect a state in the interior of the pipe, for example, the pressure, the speed of a volume flow, the temperature, etc.

A device according to this exemplary embodiment, may allow to draw direct conclusions about the quality of the conveying behaviour of the vacuum system and to locate any deposits in the system.

According to another exemplary embodiment, the second flexible opening is may be connected to the pipe by using an adapter such that the device may easily be adapted to various forms of receiving containers for charging material or feed.

According to another exemplary embodiment, the device further comprises an interface, which is, for example, arranged on the acquisition device, in order to supply the acquired state values in the interior of the pipe to an external evaluation unit. Such an external evaluation unit may, for example, be a laptop or a PC.

According to an exemplary embodiment, a method for diagnosing the vacuum system, includes steps where the cover, which is hingeably arranged on the pipe, is closed, and the second flexible opening of the pipe is connected to the vacuum system so as to be pressure-proof in order to acquire a pressure differential between the pipe and the vacuum system.

According to another exemplary embodiment of the method during the diagnosis of the vacuum system, the cover is opened and the second flexible opening of the diagnostic device is connected to the vacuum system so as to be pressure-proof in order to acquire a volume flow in the pipe. The volume flow and the pressure difference may, for example, be compared to each other in order to determine any pressure losses that occur in the vacuum system. In another example, the volume flow and the pressure difference are considered and pressure losses that occur in the vacuum system are determined.

When the method is repeated at various locations in the vacuum system, changes in the cross section in the pipeline system of the vacuum system, may be determined.

BRIEF DESCRIPTION OF THE FIGURES

The examples described and drawings rendered are illustrative and are not to be read as limiting the scope of the invention as it is defined by the appended claims.

DETAILED DESCRIPTION OF PREFERRED EMBODIMENTS OF THE INVENTION

Below, identical components in the figures have the same reference signs in different illustrations.

Figure 1:
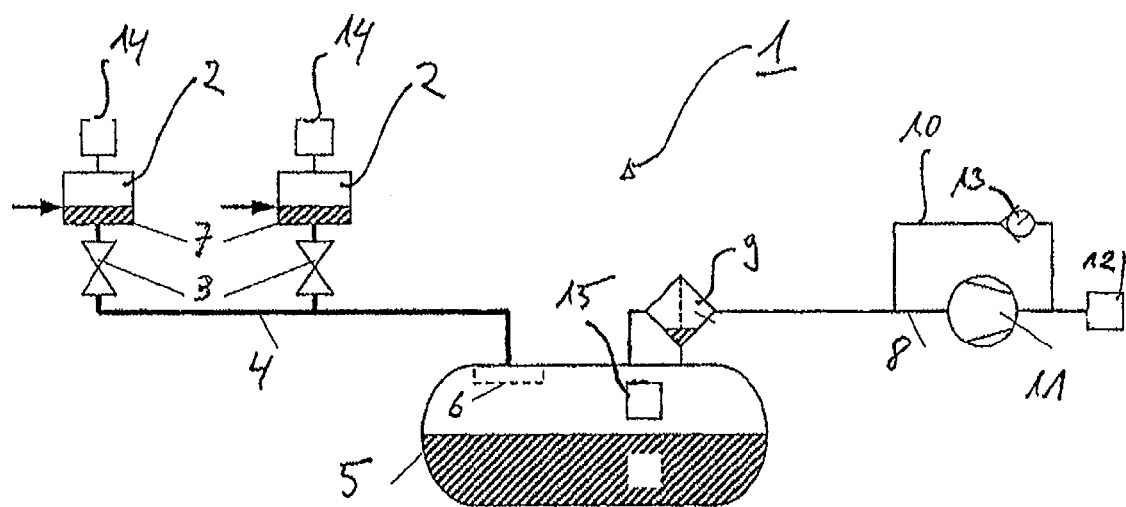
FIG. 1 shows a diagrammatic view of a conventional vacuum system for aircraft with a pressurised cabin.

FIG. 1 shows a conventional vacuum system 1 for aircraft having a pressurised cabin. The vacuum system 1 comprises a plurality of receiving containers 2 (for example, toilet bowls) of a vacuum toilet, where receiving containers 2 are connected to a central collection tank 5 by way of a flush valve 3 and a pipeline system 4.

As shown in FIG. 1, at the entrance to the tank 5 there is a special inflow device 6, whose task it is, among other things, to reduce the kinetic energy of a material 7 to be transported (feed), which material 7 is conveyed from the receiving container 2 to the collection tank 5 in order to protect the collection tank 5.

By way of a further pipe system 8, the collection container 5 is connected, via a separator 9 with a tank return 10 and a compressor 11, to the exterior environment 12 of an aircraft. A nonreturn valve 13 is arranged, parallel to compressor 11. In another example, the arrangement of the nonreturn valve is different.

In the case of an insufficient pressure difference between a cabin 14, in which the receiving containers 2 are arranged, and the environment 12, the vacuum system 1 is operated with the compressor 11. In this case, the compressor 11 starts up at the latest when a flushing process is requested. In the interval of several seconds until the flush valve 3 is opened, negative pressure is already generated in the tank interior 15. Thus, as soon as the flush valve 3 is opened, transport of the feed 7 to the collection tank 5 occurs immediately. The compressor 11 continues to run at least until the flush valve 3 is closed, thus maintaining negative pressure in the collection tank 5 to ensure uninterrupted transport. The separator 9 prevents the material to be transported from leaving the collection container 5. Furthermore, the compressor 11 and the environment 12 are protected against contamination. In this operating mode, the nonreturn valve 13 remains closed.

In an alternative operating mode of the vacuum system 1 with a sufficient pressure difference between the cabin 14 and the environment 12, the compressor 11 remains switched off. With the flush valve 3 closed, in this operating mode, the pressure in the connection tank 5 is the same low pressure as that outside the aircraft. With the flush valve 3 open, negative pressure in the tank 5 is maintained by the air flowing out via the nonreturn valve 13.

The diagnostic device 16, according to an exemplary embodiment, diagnoses the pipeline systems 4, 8 of the vacuum system 1 and is described with reference to FIG. 2.

Figure 2:
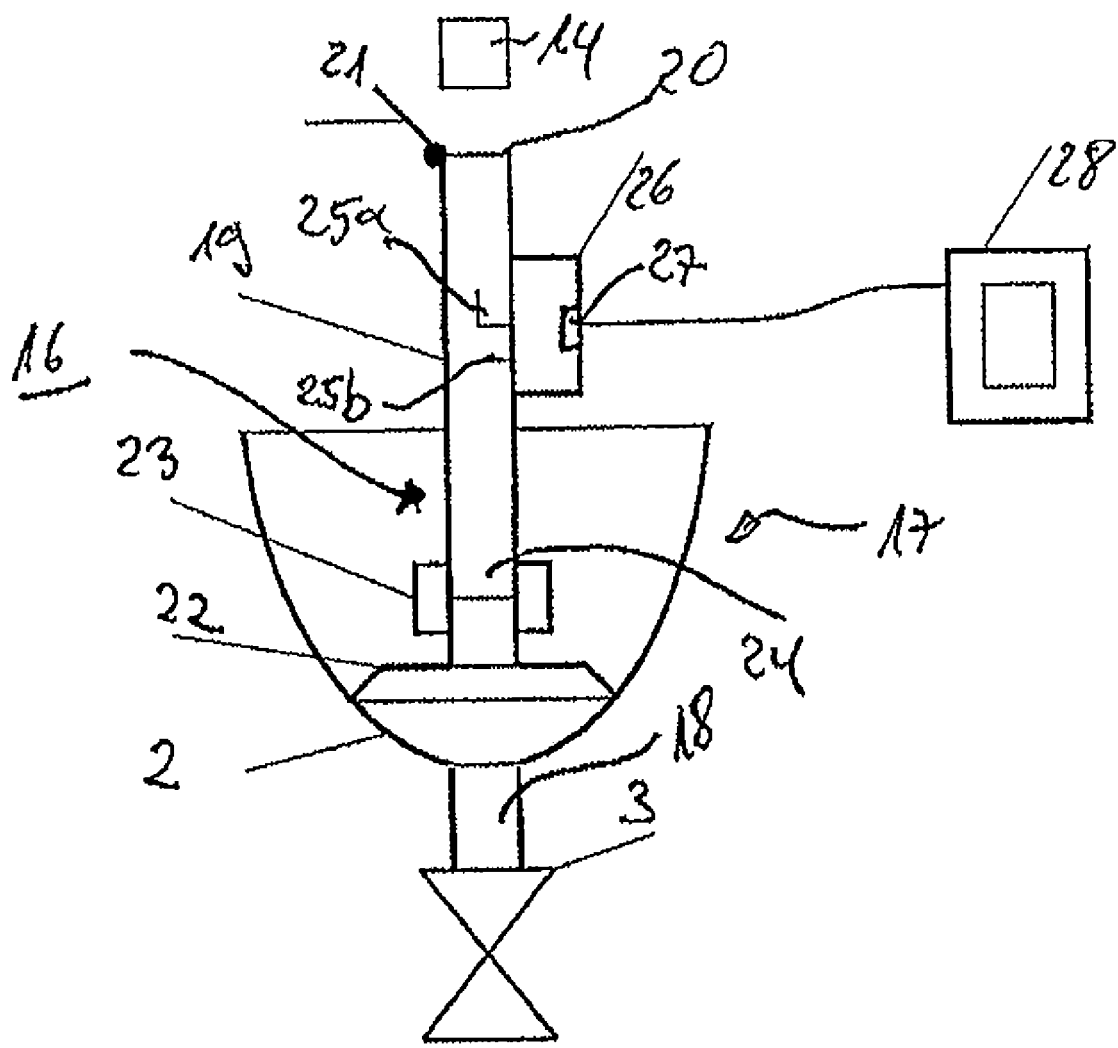
FIG. 2 depicts a device according to a preferred exemplary embodiment.

As shown in FIG. 2, according to the preferred exemplary embodiment, the diagnostic device 16 is arranged in a vacuum toilet 17 that contains the receiving container 2 that is capable of connecting to the vacuum system 1 (not shown) via a pipe stub 18 and the flush valve 3.

The diagnostic device 16 comprises a base body 19, which according to the exemplary embodiment, is a pipe. An opening 20 of the pipe 19 which projects from the receiving container 2 may be closed by a cover 21 that is hingeably arranged on the pipe 19.

The end of the pipe 19, whose end is opposite the opening 20, comprises a second opening 22 that is flexible and conforms to the inner surface of the receiving container 2 such that the diagnostic device 16 can be connected in a pressure-proof manner with the vacuum system 1.

According to the embodiment, the flexible opening 22 of the diagnostic device 16 is connected to a connection region 24 of the pipe 19 using an adapter 23.

As shown in FIG. 2, the pipe 19 comprises sensors 25a, b in order to measure physical states within the pipe, for example, a temperature, a volume flow, a pressure, a pressure difference, etc.

The sensors 25a and b are connected to an acquisition unit 26 that receives measured values acquired by the sensors 25a and 25b. The acquisition unit 26 may, for example, comprise a display (not shown) in order to display the acquired measured values.

According to the embodiment, the acquisition unit 26 comprises an interface 27, through which the acquisition unit 26 (or the diagnostic device 16) is capable of connecting to an external processing unit 28, (for example, a PC), which is an example of an external evaluation unit.

Below, the function of the diagnostic device 16 shown in FIG. 2 is described in conjunction with FIG. 1.

Basically, the diagnostic device 16 has two operating modes. In a volume-flow mode, ambient air freely flows through the device 16 during a flushing process. In this mode, the cover 21 is open. In a negative-pressure mode, the device 16 is closed off towards the environment 14 such that the cover 21 closes off the first opening 20 of the pipe 19 of the diagnostic device 16 such that it is airtight. The pressure in the vacuum system 1 is acquired for the period during which the flush valve 3 is open. The information from the two operating modes is used for a targeted examination of the vacuum system.

From the pressure gradient over time or the pressure developing, in the negative-pressure mode, it may be possible to draw conclusions about the available pressure difference. This pressure difference is influenced by the compressor 11, as shown in FIG. 1, the air volume in the vacuum system 1, any leaks, the state of the separator 9 as shown in FIG. 1, as well as by any possible blockages in the pipeline 8 between the collection tank 5 and the aircraft environment 12. An important characteristic of such measuring consists of its far-reaching independence of the position of the receiving container 2 in the system.

A comparison with the volume flows that actually occur in the complementary operating mode makes it possible to draw conclusions on any pressure losses that result. In contrast to negative pressure, such pressure losses depend on the length of the pipeline 4 between the receiving container 2 and the collection tank 5. In particular from measurements at different receiving containers, reductions in a cross section within this pipeline 4, may be detected where the reductions have been caused by deposits, for example, and within sections of the pipeline to determine the locations of such reductions in the cross section.

To this effect it is among other things necessary to know the desired pressure-loss coefficients depending on a position of the receiving container 2 in the system. In contrast to this, the diagnosis of the flush valve 3 in relation to the verification of the opening duration is a direct result.

Although an embodiment has been described, modifications and changes can of course be made without leaving the scope of protection of the device. For example, any number of receiving containers 2 can be provided, wherein the receiving container 2 does not necessarily have to form part of a vacuum toilet; instead it may form part of a disposal system that disposes of kitchen waste from the cabin of an aircraft, in an alternative example.

Furthermore, above, the device has been described with reference to its use in an aircraft. However, the device can be used wherever a vacuum system is used to transport feed or charging material, wherein the charging material can also be a material other than toilet waste or kitchen waste.

It should be noted that the term "comprising" does not exclude other elements or steps and the "a" or "an" does not exclude a plurality. Also elements described in association with different embodiments may be combined. It should also be noted that reference signs in the claims shall not be construed as limiting the scope of the claims.

Alternative combinations and variations of the examples provided will become apparent on this disclosure. It is not possible to provide specific examples for all of the many possible combinations and variations of the embodiments described, but such combinations and variations may be claims that eventually issue.

LIST OF REFERENCE SIGNS

1 Vacuum system
2 Receiving container
3 Flush valve
4 Pipeline system
5 Collection tank
6 Inflow device
7 Material to be transported
8 Pipe system
9 Separator 10 Tank return
11 Compressor
12 Exterior environment
13 Nonreturn valve
14 Cabin
15 Tank interior
16 Diagnostic device
17 Vacuum toilet
18 Pipe stub
19 Base body
20 First opening
21 Cover
22 Second opening
23 Adapter
24 Pipe connection region
25a,b Sensors
26 Acquisition unit
27 Interface
28 External processing device

What is claimed is:

1. A device to diagnose a vacuum system including a plurality of receiving containers being connected to a collection tank by way of a flush valve and a pipeline system, the device being separate from the vacuum system and comprising:
a hollow base body having a first opening and a second opening; and
an acquisition unit,
wherein the first opening is closeable by a hingable cover, the second opening is flexible and conformable to an inner surface of a plurality of the plurality of receiving containers such that the diagnostic device can be connected in a pressure-proof manner with the vacuum system, and the acquisition unit is adapted to acquire measuring values that designate a state in an interior of the base body.

2. The device of claim 1,
wherein the acquisition unit is arranged on an outside of the base body and communicates with at least one sensor, arranged in the interior of the base body, and the sensor acquires a temperature, a pressure, an air flow, or combinations thereof in the interior of the base body.

3. The device of claim 1, wherein the acquisition unit comprises a display to display the acquired measured values.

4. The device of claim 1, wherein the base body is designed as a pipe.

5. The device of claim 1, wherein the second opening is capable of connecting to the base body using an adapter.

6. The device of claim 1, wherein the acquisition unit comprises an interface for connection to an external evaluation unit.

7. A method for diagnosing a vacuum system with the device of claim 1, the method comprising:
closing the cover; and
pressure-proof connecting the second opening with an outlet of a receiving container of the vacuum system, in order to acquire a pressure of the base body and the vacuum system while the cover closes the outlet of the receiving container of the vacuum system to ambient cabin air pressure.

8. The method of claim 7, wherein a pressure gradient over time in the vacuum system is recorded by the data acquisition unit, as part of a data acquisition system.

9. The method of claim 7, further comprising:
determining a volume flow from measuring the total pressure over time and from measuring the differential between the total pressure over time and a static pressure in conjunction with measuring a temperature in the base body.

10. The method of claim 7, wherein the method includes repeating the method of claim 8 at various locations in the vacuum system in order to determine changes in a cross section in a pipeline system of the vacuum system.

11. The method, of claim 7, wherein the method includes using the diagnostic device in a vacuum toilet.

12. Diagnosing a vacuum system of an aircraft using the method of claim 7.

13. The method of claim 7, further comprising:
opening the cover and pressure-proof connecting the second opening with the vacuum system, in order to acquire a volume flow in the base body.

14. The method of claim 13, wherein the acquiring of the volume flow in the vacuum system includes a recording by the acquisition unit over time.

15. The method of claim 13, wherein the method includes considering the pressure difference and the volume flow and determining pressure losses that occur in the vacuum system.

* * * * *